US009087138B2

(12) United States Patent
Zhou

(10) Patent No.: US 9,087,138 B2
(45) Date of Patent: Jul. 21, 2015

(54) METHOD FOR REPRESENTING AND STORING HIERARCHICAL DATA IN A COLUMNAR FORMAT

(71) Applicant: Xiaofan Zhou, Cupertino, CA (US)

(72) Inventor: Xiaofan Zhou, Cupertino, CA (US)

(*) Notice: Subject to any disclaimer, the term of this patent is extended or adjusted under 35 U.S.C. 154(b) by 103 days.

(21) Appl. No.: 13/741,478

(22) Filed: Jan. 15, 2013

(65) Prior Publication Data

US 2014/0201244 A1    Jul. 17, 2014

(51) Int. Cl.
*G06F 17/30* (2006.01)

(52) U.S. Cl.
CPC .......... *G06F 17/30917* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 5,291,583 A | 3/1994 | Bapat | |
| 6,028,602 A | 2/2000 | Weidenfeller et al. | |
| 6,330,572 B1 | 12/2001 | Sitka | |
| 6,480,857 B1 | 11/2002 | Chandler | |
| 6,708,164 B1 | 3/2004 | Cseri et al. | |
| 6,853,997 B2 | 2/2005 | Wotring et al. | |
| 7,099,887 B2 | 8/2006 | Hoth et al. | |
| 7,418,456 B2 | 8/2008 | Charlet et al. | |
| 7,519,609 B2 | 4/2009 | McConnell | |
| 7,599,947 B1 | 10/2009 | Tolbert et al. | |
| 7,853,621 B2 | 12/2010 | Guo | |
| 8,290,957 B2 | 10/2012 | Sorakado | |
| 8,332,815 B2 | 12/2012 | Balfe et al. | |
| 2006/0235820 A1 | 10/2006 | Hoth et al. | |
| 2008/0306983 A1* | 12/2008 | Singh | 707/102 |
| 2011/0029489 A1* | 2/2011 | Zhao | 707/648 |
| 2011/0060718 A1 | 3/2011 | You et al. | |
| 2011/0289118 A1* | 11/2011 | Chen et al. | 707/803 |
| 2011/0313979 A1* | 12/2011 | Roberts | 707/690 |
| 2012/0233522 A1 | 9/2012 | Barton et al. | |
| 2012/0324459 A1 | 12/2012 | Agarwal | |

OTHER PUBLICATIONS

International Search Report for PCT/US2013/074476 (PCT version of U.S. Appl. No. 13/741,478).

* cited by examiner

*Primary Examiner* — Robert Beausoliel, Jr.
*Assistant Examiner* — Pedro J Santos
(74) *Attorney, Agent, or Firm* — Stephen E. Zweig

(57) ABSTRACT

A computer implemented system, program product, and method that organizes hierarchical data into a plurality of columns is disclosed. A schema interface is defined for the data and two types of columns, value columns and occurrence columns, are used. Each value column stores the values for a field. Each occurrence column stores the occurrence numbers for a node that is repeatable, or optional, or in a choice group. The hierarchical relationship of the data is jointly preserved by the schema interface and the occurrence numbers in the occurrence columns. A database management system built upon the method is capable of operating at higher efficiency by combining some of the best aspects of relational database and hierarchical database management systems. The computer implemented method also provides a new and efficient method of exchanging data over networks.

12 Claims, 8 Drawing Sheets

Figure 2

```xml
<?xml version="1.0"?>
<MovieList>
    <Header>
        <Creator>Ray Harper</Creator>
        <Cdate>2007</Cdate>
    </Header>
    <Movie>
        <Title>Happy Feet </Title>
        <Date>2012</Date>
        <Stars>
            <Actor>Elijah Wood</Actor>
            <Actress>Brittany Murphy</Actress>
            <Actor>Hugh Jackman</Actor>
        </Stars>
    </Movie>
    <Movie>
        <Title>Samantha</Title>
        <Stars>
            <Actress>Olivia Ballantyne</Actress>
            <Actress> Annasophia Robb </Actress>
        </Stars>
    </Movie>
    <Movie>
        <Title>Madagascar </Title>
        <Date>2012</Date>
        <Stars>
            <Actor>Ben Stiller</Actor>
            <Actress>Jada Pinkett Smith</Actress>
            <Actor>Chris Rock</Actor>
        </Stars>
    </Movie>
</MovieList>
```

Figure 3

```
<xsd:schema xmlns:xsd="http://www.w3.org/2001/XMLSchema">
<xsd:element name="MovieList" type=" moveListType"/>
 <xsd:complexType name="moveListType">
   <xsd:sequence>
     <xsd:element name="Header" type=" headerType"/>
     <xsd:element name="Movie" type="movieType" maxOccurs="unbounded"/>
   </xsd:sequence>
 </xsd:complexType>
 <xsd:complexType name="headerType">
   <xsd:sequence>
     <xsd:element name="Creator" type="xsd:string"/>
     <xsd:element name="Cdate" type=" myYear"/>
   </xsd:sequence>
 </xsd:complexType>
 <xsd:complexType name="movieType">
   <xsd:sequence>
     <xsd:element name="Title" type="xsd:string"/>
     <xsd:element name="Date" type="myYear" minOccurs="0"/>
     <xsd:element name="Stars" type="starsType"/>
   </xsd:sequence>
 </xsd:complexType>
 <xsd:complexType name=="starsType">
   <xsd:sequence>
     <xsd:group ref="Star" maxOccurs="unbounded"/>
   </xsd:sequence>
 </xsd:complexType>
 <xsd:group name="Star">
   <xsd:choice>
     <xsd:element name="Actor" type="myString"/>
     <xsd:element name="Actress" type="myString"/>
   </xsd:choice>
 </xsd:group>
 <xsd:simpleType name="myYear">
   <restriction base="xsd:gYear">
     <pattern value="^(19|20)\d\d"/>
   </restriction>
 </xsd:simpleType >
 <xsd:simpleType name="myString">
   <restriction base="xsd:string">
     <maxLength value="32"/>
   </restriction>
 </xsd:simpleType >
</xsd:schema>
```

Figure 4

```
         MovieList  0 maxOccurs="unbounded"
         {
             Header 1
             {                              400
                 Creator 2 string;
                 Cdate 3 myYear;
             };
             Movie 4 maxOccurs="unbounded"
             {
                 Title 5 string;
   406  408      Date 6 myYear minOccurs="0";        404
                 Stars 7                402
                 {
                     Star 8 choice maxOccurs="unbounded" pseudo
                     {
                         Actor 9 myString;
                         Actress 10 myString;
                     };
                 };
             };
         };

simpleType myYear base="gYear" pattern="^(19|20)\d\d";
         simpleType myString base="string" maxLength="32";
```

Figure 6

Value columns

| Unique ID | 0 | 2 | 3 | 4 | 5 | 6 | 6 | 8 | 9 | 9 | 10 | 10 |
|---|---|---|---|---|---|---|---|---|---|---|---|---|
| | 1 | Ray Harper | 2012 | 3 | Happy Feet | 1 | 2007 | 3 | 1 | Elijah Wood | 0 | Brittany Murphy |
| | | | | | Samantha | 0 | 2012 | 2 | 0 | Hugh Jackman | 1 | Olivia Ballantyne |
| | | | | | Madagascar 3 | 1 | | 3 | 1 | Ben Stiller | 0 | AnnaSophia Robb |
| | | | | | | | | | 0 | Chris Rock | 1 | Jada Pinkett Smith |
| | | | | | | | | | 0 | | 1 | |
| | | | | | | | | | 1 | | 0 | |
| | | | | | | | | | 0 | | 1 | |
| | | | | | | | | | 1 | | 0 | |

Occurrence columns

Figure 8

| ID | Bytes | Comment |
|---|---|---|
|  | 0x00 | The first byte. The default value for this byte, meaning the unique ID in each column takes one byte. |
| 0 | 0 0x00 1 1 | 4 bytes. The first "0" is the unique ID. The second hex value is the default, meaning both the number of entries and each entry value, the occurrence number, takes one byte. The first 1 is the number of entries (1), and the second "1" is the actual entry value (1). |
| 2 | 2 0x00 1 10 Ray Harper | 14 bytes. 1 byte for the ID "2", the hex value, and the number of entries (1), and the length of string for the "Creator" (10). The actual string value "Ray Harper" takes 10 bytes. |
| 3 | 3 0x00 1 2012 | 7 bytes. 1 byte each for the ID "3", the hex value, and the number of entries (1). The actual value "2012" takes 4 bytes. The field "Cdate" is a fixed- length field. |
| 4 | 4 0x00 1 3 | 4 bytes. See the occurrence column "0". |
| 5 | 5 0x00 3 10Happy Feet 8Samantha 12Madagascar 3 | 36 bytes. 1 byte each for the ID "5", the hex value, the number of entries (3), and each length value 10, 8, and12. The three strings for the movie titles take 10, 8, 12 bytes respectively. |
| 6 | 6 0x10 3 0x05 | 4 bytes. 1 byte each for the ID "6", the hex value, and the number of entries (3), and 0x05 for 101. The first lower two bits of the hex value are 00, meaning the number of entries takes 1 byte, the third two bits is 01, meaning this is an occurrence column. The rest bits are not used. |
| 6 | 6 0x00 2 2007 2012 | 11 bytes, 1 byte each for the ID "6", the hex value, and the number of entries (2), and 4 bytes each for the year, a fixed-length field. The first lower two bits of the hex value is 00, meaning the number of entries takes 1 byte, the third two bits is 00, meaning this is a value column. |
| 8 | 8 0x00 3 3 2 3 | 6 bytes. See the occurrence column "0". |
| 9 | 9 0x10 8 0xA5 | 4 bytes. 1 byte each for the ID "9", the hex value, the number of entries (8), and 0xA5 for 10100101. The first lower two bits of the hex value is 00, meaning the number of entries takes 1 byte, the third two bits is 01, meaning this is an occurrence column. |
| 9 | 9 0x00 4 11Elijah Wood 12Hugh Jackman 11Ben Stiller 10Chris Rock | 51 bytes. 1 byte for the ID, the hex value, the number of entries (4), and each of the four length values. The first lower two bits of the hex value are 00, meaning the number of entries takes 1 byte, the second two bits are also 00, meaning each length value takes one byte, and the third two bits are again 00, meaning this is a value column. |
| 10 | 10 0x10 8 0x5A | 4 bytes. Same as the occurrence column "9". |
| 10 | 10 0x00 4 15Brittany Murphy 17Olivia Ballantyne 15AnnaSophia Robb 18Jada Pinkett Smith | 72 bytes. Same as the value column "9". |

METHOD FOR REPRESENTING AND STORING HIERARCHICAL DATA IN A COLUMNAR FORMAT

BACKGROUND OF THE INVENTION

1. Field of the Invention

This invention is in the field of computer database and data transmission methods.

2. Description of the Related Art

BACKGROUND

Efficient data acquisition, storage, transport, and analysis are vital to the success of any organization in our society. Over time, workers in the field have developed many different kinds of methods to perform these tasks. One important method is represented by the various relational database management systems, the principles of which are described in the publication by Codd (Codd, E. F. (1970). "*A Relational Model of Data for Large Shared Data Banks*". *Communications of the ACM* 13 (6): 377-387).

In relational database management systems, the data is organized in a set of tables, where each table contains a set of rows, each row in turn comprises an ordered list of pre-defined columns, and each column contains an atomic value of pre-defined simple data type. Data retrieval from these kinds of systems often use select operation to identify rows, project to identify columns, and join to combine tables.

From a data storage perspective, there are two types of relational database management systems, one type uses row oriented storage layout, and the other type uses column oriented layout. In practice, row oriented databases tend to be preferred for Online Transaction Processing (OLTP) applications. By contrast, column oriented databases tend to be preferred for Online Analytical Processing (OLAP) applications.

For certain applications, relational database management systems are relatively efficient in terms of computer processing time required to implement a particular operation of interest. This is because certain real world complicated relations among various entities can be simulated relatively efficiently using a set of tables; also, the table format allows the memory address of the target data to be identified in a relatively small number of computer processor operations, and this is efficient in terms of processor clock cycle use for various data storage and retrieval purposes.

Another important method is to organize data in a tree-like hierarchical structure representing parent-to-child or one-to-many relationships. This method is easy to understand because a parent-to-child relationship between different entities is very common in everyday life. Additionally, since this method tends to arrange closely related data together into branches, it is efficient for certain types of data navigation and retrieval purposes. This is because users often do not have to perform join operations. Further, this method has another advantage in that the sub-trees in the hierarchical structure naturally provide an excellent mechanism for data partitioning.

There are many data storage and management systems that use this type of hierarchical method. One example is the IBM's Information Management System (IMS), a hierarchical database built in the late 1960s. This database implemented the hierarchy using segments and fields (a segment is a block of data containing a list of fields and child segments). Another example is the Hierarchical Data Format (HDF5). The key data structures in this product are a multidimensional array of record structures and a grouping structure. This product is widely used in the scientific research community. ROOT, a C++ based data analysis framework developed by the European Organization for Nuclear Research (CERN), is yet another example. A ROOT file is like a UNIX file directory containing directories and objects organized in unlimited number of levels. It stores not only the data but also the C++ object format. ROOT is mainly used in experimental high energy physics.

Each type of the data storage and management methods, relational and hierarchical, has its own particular strengths and weaknesses, or relative efficiency of use in terms of processor time and memory requirements.

Prior art work attempting to utilize the strengths of both methods includes Chandler, U.S. Pat. No. 6,480,857, Wotring et al., U.S. Pat. No. 6,853,997 B2, and Hoth et al., U.S. Pat. No. 7,099,887. Chandler presents a method of organizing hierarchical data in a relational database. Wotring et al. provides a method for transforming relational database information into a hierarchical data representation. Hoth describes a method for implementing a relational schema in a hierarchical database.

Other prior art includes the work of C. W. Chung and K. E. McCloskey in their paper "Access to Indexed Hierarchical Databases Using a Relational Query Language", *IEEE Transactions on Knowledge and Data Engineering*, Vol. 5, No. 1, pp. 155-161, February 1993.

Although this prior art, and other prior art methods such as adjacency list methods and nested set methods, have been used to address certain specific applications or use case scenarios, the fact remains that the two methods are starkly different. Applications built upon one method generally do not interface well with other applications built upon the other method. Instead, at least one extra layer of software, and many extra computer processor clock cycles, are usually needed to transform data between the applications.

Besides being broadly used in data storage, management and analysis, the method of organizing data in a hierarchical structure dominates the field of data exchange (messaging) between disparate business entities, computing systems or software applications. Further, due to the ever-growing demand of distributed computing environment and the need for integration, workers in the information technology industry and the scientific research community have been constantly searching for more efficient data exchange methods. Over the years, various standard methods have been developed. Some notable ones include:

ASN.1 for Abstract Syntax Notation One, a standard produced by the International Organization for Standardization (ISO), International Electrotechnical Commission (IEC), and International Telecommunication Union Telecommunication Standardization Sector EDI/EDIFACT for electronic business data interchange FIX for the real-time electronic exchange of securities transactions These standard methods of exchanging data (message protocols) were developed and used in specific business domains. With the invention and growth of the internet, more general purpose mechanism for data exchange (message exchange) were also needed, and two new methods of organizing data in a hierarchy, the Extensible Markup Language (XML) and JavaScript Object Notation (JSON) were subsequently developed. XML and JSON are both textual data formats that are both human and machine readable. XML also allows users to specify a set of rules (schema) defining the content model and the 'validity' of an XML document. JSON provides further message simplicity by using a name/value pair construction approach.

In more recent years, with the advent of low cost high capacity computer data storage devices, high speed optical fiber computer networks, and cloud computing, the amount of data now available on the internet and in proprietary computer clusters for various applications has exploded. Indeed, in the last few years, many in the field have started to define the current IT era as being the era of "big data".

Big data storage and analysis were originally pioneered by various research institutions, such as the European Organization for Nuclear Research (CERN) and The National Aeronautics and Space Administration (NASA). They encountered the problem of handling large amounts (e.g. petabytes) of data ahead of the commercial world, and these research organizations initially handled these problems using their own custom data formats (e.g. HDF5 and ROOT) and their own specialized analytical software.

However as big data became more common, the workers in the field found such specialized approaches to be inflexible and prohibitively expensive to implement. Thus, big data companies such as Google, Facebook and Yahoo turned to developing their own proprietary and/or open source software methods to handle big data. Unfortunately, as data transfer needs increased in the clusters of servers and applications, it became increasingly clear that the general purpose data exchange methods based on XML and JSON did not produce adequate performance. As a result, various newer data exchange methods were also developed.

Google has developed a method of serializing hierarchically structured data called "Protocol Buffers". One of Protocol Buffers' design goals was to be smaller and faster than XML. The Protocol Buffers method involves a message schema that defines the structure and various constraints of the data. Once this schema is available, source code in various programming languages can be generated from this schema that in turn is used to generate or parse a stream of bytes that represent the hierarchical structured data. Another notable feature in Protocol Buffers is that it provides backward and forward compatibilities in the schema definition so as to allow schema evolution.

Google also built an ad-hoc query system called Dremel for analysis of read-only hierarchically structured data. To improve data retrieval efficiency, Dremel uses a columnar storage representation that stores all values of a given field consecutively. However, besides being read-only, this columnar representation requires two extra pieces of information, repetition and definition levels, for each field value. The Dremel system is described in a paper by Melnick et. al. (Sergey Melnik, Andrey Gubarev, Jing Jing Long, Geoffrey Romer, Shiva Shivakumar, Matt Tolton, Theo Vassilakis: Dremel: Interactive Analysis of Web-Scale Datasets. Proc. of the 36th Int'l Conf on Very Large Data Bases, 2010, pp. 330-339).

Facebook uses an interface definition language called Thrift (Apache Thrift). Thrift is used to define and create scalable cross-language services and it is quite similar to Protocol Buffers in terms of the data exchange format. They also both use unique integer tags to identify fields so that the user can add or remove fields, yet still maintain backward compatibility.

Yahoo originated the development of a distributed computing system that later became the Apache's Hadoop open source project. This Hadoop project uses Avro as the data serialization and deserialization methods. Avro's functionality is very close to Protocol Buffers and Thrift, but in Avro, data is always accompanied by a JSON based schema that allows processing of that data without code generation, or use of static data types.

Many other data exchange methods or interface definition languages (IDL) also exist that attempt to improve communication efficiencies between computers, applications or other software components and address specific business requirements. While each messaging format and the data encoding mechanism might be different, they are still fundamentally the same, that is, the parent-child relationship among data entries are directly represented in the data, which may incur a lot of redundancy.

Earlier in this discussion, the comparative efficiency of various database models, relational and hierarchical, in terms of processor clock cycles was discussed. Each processor clock cycle uses a small amount of electrical power. Although the electrical power used by any given processor clock cycle is extremely small, the net effect of millions and billions of processors running at gigahertz clock cycles is anything but small. In fact, it is starting to consume an appreciable amount of the planet's available energy resources.

To illustrate the magnitude of this issue, consider the following. In the New York Times article by James Glanz entitled "*The Cloud Factories, Power, Pollution, and the Internet*" (New York Times Business Day Technology, Sep. 22, 2012), it was estimated that in 2010, nationwide 76 billion kilowatt hours, or roughly 2% of all electricity used in the US, went into data centers. Since then, this usage has grown. The article further estimated that in 2012, Google's data centers alone consume nearly 300 million watts of power, and that in 2011, on a worldwide basis 1.8 trillion gigabytes of digital information was created globally last year.

Given the continued explosion of data, these numbers will almost certainly increase in future years. Therefore, the need exists to come up with improved methods for both managing computer databases and computer data transmission. On a large scale, improved methods to manipulate big data, in addition to commercially valuable gains in improved computer system performance and greater insights, can also result in major savings in power, lower costs, and less environmental pollution as well.

BRIEF SUMMARY OF THE INVENTION

In one embodiment, the invention may be a method combining some of the best aspects of relational database and hierarchical database methods to produce a new combined method capable of operating at higher efficiency. In this embodiment, the invention may be a method of organizing hierarchical data in a columnar format to be stored in a computer database.

This method may generally comprise using a computer processor to create a schema for a type of hierarchical data. The method may also comprise using a computer processor to receive a plurality of instance data of this type of hierarchical data. Here, this instance data may generally comprise a plurality of data entries organized in a hierarchical relationship.

In some embodiments, the invention's methods may operate by matching each instance data against the schema and producing a plurality of columns of data, wherein there exists two types of columns, value columns and occurrence columns. Here each value column comprises an array of scalar values of same data type for a field in the schema, and each occurrence column comprises an array of occurrence numbers for a node in said schema. A node that is allocated an occurrence column must be repeatable, optional or choosable. A "choosable" node is a child node of a parent node whose type is "choice". Essentially the value columns store the value of the various leaf nodes in the hierarchical data "tree", while the occurrence columns, together with the predefined schema, preserve the structural information of the hierarchical data "tree".

The results of this process can then be used for various activities, such as storing the columns of data in a computer database, serializing the columns of data into a stream of bytes of data (e.g. for message transmission); or performing one or more queries on the hierarchical data as stored in the column oriented format. Additionally, at least with regards to hierarchical data stored in this column oriented format, other operations, such as updates, insertions, and deletions may also be done.

In an alternate embodiment, the present invention may also provide a new method of serializing and de-serializing hierarchically structured data that is very useful for communication between computer processors. The invention's column oriented methods allow the values for a field to be stored together in a manner that separates the data from the metadata. Instead the metadata, which includes the hierarchical structure information and the field data types, is predefined in a schema. By only serializing the field values and the occurrence numbers of repeatable, optional or choosable nodes, this results in a much smaller message to be transmitted over networks.

The invention's methods provide a new type of database management system that naturally integrates some of the advantages of both the hierarchical databases and the relational databases. This is because a table comprising a set of rows is one of the simplest form of a hierarchical data, and can be organized into the column oriented form. The invention's methods also provide a new type of data exchange system that not only improves system performance but also integrates seamlessly with said new type of database management system. The invention's methods are also well suited for object oriented systems where the various objects have a parent-child relationship.

BRIEF DESCRIPTION OF THE DRAWINGS

FIG. 2 shows how the hierarchical structured movie list example from FIG. 1 would be represented according to a prior art XML message.

FIG. 3 shows how an XML schema may be defined to represent the hierarchical relationship and the value constraints of the data entries previously shown in FIG. 1, and expressed in the XML message shown in FIG. 2.

FIG. 4 shows how the invention's methods may define the schema used to represent the same hierarchical relationship and the value constraints of the data entries previously shown in FIG. 1. This is the first step in order to organize the hierarchical data from FIG. 1 into an alternate column oriented form that may then be stored in computer memory. Here the metadata schema is defined in a tree-like structure that is expanded, meaning that any record or field is defined and used only once in the structure. Additionally, each record or field is assigned a unique ID that is unique in the entire structure.

FIG. 6 shows an example of how the hierarchical data shown in FIG. 1 may be stored in computer memory as a series of columns. According to the invention, there are two types of columns: value columns and occurrence columns. Using these methods, a computer processor can then perform query, update, insert or delete from this data in column oriented format with much higher efficiency (e.g. fewer clock cycles), relative to prior art methods.

FIG. 8 shows how the invention's methods can be used to serialize the hierarchical data in FIG. 1 into a stream of bytes, here using the column oriented format previously described in FIG. 6. A computer processor can combine these columns of data into a message that can then be transmitted over various internal (e.g. within a computer cluster) or external (i.e. over the internet) networks. Relative to prior art approaches, the resulting message is both smaller in size (e.g. fewer number of bits) and easier to be parsed and analyzed.

DETAILED DESCRIPTION OF THE INVENTION

Figure 1:
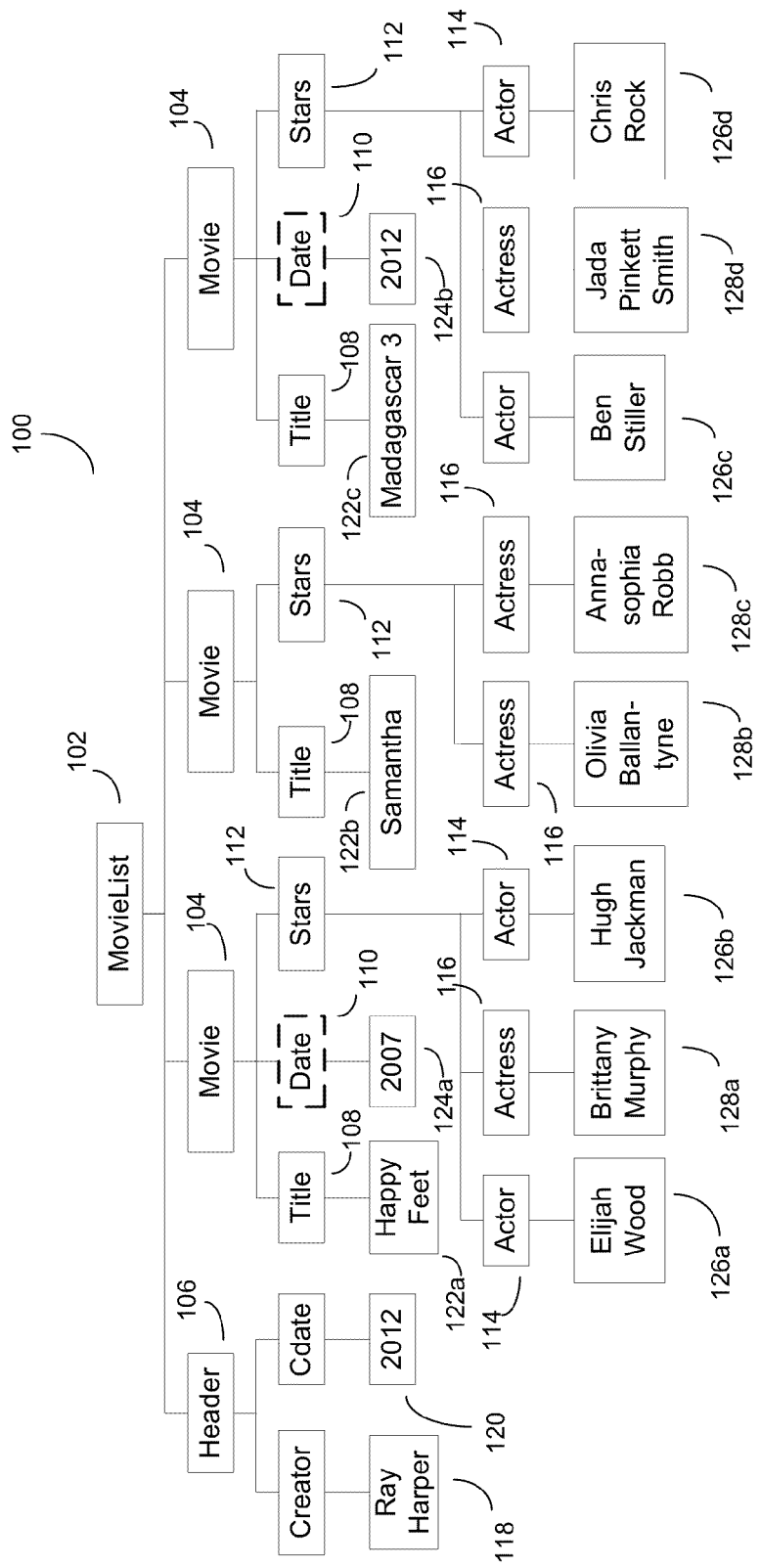
FIG. 1 shows an example of a list of movies, here represented in a tree structure showing a hierarchical relationship among the data entries.

The invention is based, in part, on the insight that while relational databases are simple, flexible and powerful in data storage and management, they possess a few important drawbacks. These are:

1: Modeling of complicated objects or relationships is hard and inefficient because a large number of tables and join operations have to be involved. As datasets become large, query performance and scalability tend to degrade quickly, especially when the data needs to be spread over many server nodes in a massively distributed computing environment (e.g. cluster computing).

2: Since, in a relational database, a column in a row can only store an atomic value, this limitation prevents the relational database tables from representing some of the common data structures such as collections (arrays, sets and lists et cetera) and trees (i.e. hierarchical data). For example, a prior art relational database column named "phone number" can usually only hold one phone number, however in the real world, a person might have several phone numbers.

3: In a relational database, there is no way to define a content model and constraints for the data in a table beyond a few things such as the column data types, character field (varchar) size and ability to support a value type that can be assigned null (nullable) or not. For example, relational databases lack a way to define whether or not certain columns are mutually exclusive (the concept of choice) in a table. As another example, relational databases also do not support minimum/maximum value constraints or minimum/maximum occurrence constraints. Consequently, any additional data quality control steps usually have to be added as another application layer on top of the relational database.

Existing hierarchical data storage and management systems, however, along with their unique advantages, also have their own share of drawbacks. These are:

1: Modeling of non-hierarchical relationships such as many-to-many relationship is hard and inefficient. Redundancy may have to be introduced.

2: Modifying the hierarchical relationship is difficult, and often requires both the physical reorganization of data and subsequent change in applications. Very few systems support schema evolution.

3: General purpose data retrieval methods or query languages do not exist. Performance for accessing data in non-hierarchical manner is poor. Insert and delete operations are either not supported (read-only) or poor in performance.

The invention is also based, in part, on the insight that the prior art data exchange methods have many weaknesses as well. Specifically:

1: Some of the specifications or standards (e.g. EDI) for these prior art data exchange methods tend to be rigid. They tend to focus too much on their respective business domains and applications, and as a result lack sufficient abstraction, generality and flexibility. It is also difficult to update and extend these standards, as well as maintain version control.

2: Some of the methods (e.g. EDI) also lack a mechanism for defining a schema for the data, and/or lack a mechanism for specifying rich content model and constraints for a particular group or field. As a result, users who wish to implement these prior art methods have to fall back to the method's documentation, specifications or standards and develop custom software to parse the data. This is often difficult and time consuming.

3: In prior art data exchange methods, metadata (e.g. the tags) exist in the instance data to preserve the hierarchical structure of the message. In some methods (e.g. Protocol Buffers), the character tags are replaced by IDs, which is an improvement, but still this causes a lot of redundancy. This problem is exemplified in XML messages.

4: In some of the prior art methods, support of binary data (e.g. images) does not exist or is very limited.

5: When de-serializing the data, applications have to create objects for each node in the message hierarchy to re-build the structure in computer memory in order to allow subsequent application components to access the data, even though a message schema is present.

6: Analysis and aggregation on the data is hard. Standard query languages are almost non-existent, except for XML, for which there are XPath and XQuery that can be used to retrieve data in the hierarchical structure.

7: The prior art methods are mostly disconnected from common database management systems, that is, using existing relational or hierarchical database management systems to store, retrieve and analyze the messages is extremely inefficient. Thus, for most methods, the sole purpose is to exchange data among different computing entities. In order to store and later analyze the data, specialized database management systems for individual data exchange format have to be built (e.g. mongoDB).

The invention overcomes many of the above prior art problems. To do this, in one embodiment, the present invention may be a method of organizing hierarchical data in a columnar format to be stored in a computer database or transmitted over networks. This method will generally comprise using a computer processor to create a schema for a type of hierarchical data. The method will also comprise using a computer processor to receive a plurality of instance data of this type of hierarchical data. Here, this instance data will generally comprise a plurality of data entries organized in a hierarchical relationship. See FIG. 1 for an example. The method will then operate by matching each instance data against the schema and producing a plurality of columns of data. These columns of data, together with the schema, fully represent the original hierarchical data. They can then be stored in a computer database, or combined to be transmitted over networks.

The invention has the following technical effects: increased speed of database operations, increased speed of data/message transmission between networked computers, decreased network bandwidth required to handle data/message transmission between networked computers, smaller amounts of memory needed to store data, and decreased computer power utilization.

Schema Definition

The invention's methods first create a schema to define the structure and data types of the fields for a particular type of hierarchical data. Here a "structure" comprises a plurality of records and fields that represents a hierarchical relationship. A record is a node in the structure that contains one or more child nodes. A "field" generally refers to a leaf node in the structure that can hold scalar values like a string or an integer. Users (i.e. the user computers) will have to have this schema to manage the data, that is, to store, serialize, de-serialize or analyze the data. This is similar to ASN.1, Protocol Buffer, Apache Thrift or Avro, but is a deviation from XML because for a given XML document, users can still retrieve the data for a field by using the path of the field, without referring to any schema.

The schema definition for the various messages in the present invention have some elements conceptually in common with other schema definition languages such as XML schema or the interface definition language in ASN.1 and Protocol Buffers in that it also defines the structure and content model of the message and the data types for the fields. However the invention's schema definition method also has some critical differences as well.

One difference is that for a given type of message, the invention's schema definition is a fully expanded schema. That is, a definition will start from the root record and expanded into a full tree structure. Thus, any definition of a record or a field is never re-used. This ensures that each record or field in the schema tree structure has a definitive meaning as described by the full path from the root node to the record or the field.

For example, in the XML schema, one can define a complex type "address" starting with a name of a person, then he/she may further define two elements "sendTo" and "billTo" to be of this "address" type. By looking at the address definition, one cannot know if the "name" is a "sendTo.name" or a "billTo.name". In the present invention, the same "address" will be defined twice or directly "expanded", one under the record "sendTo" and another under the record "billTo".

However, definitions of simple types for the fields in the present invention are similar to that in XML schema, that is, a simple type can be defined once and used multiple times. A simple type can also be derived from another simple type by restriction.

Another difference is that each record or field in the schema is assigned to a unique ID. This ID is unique in the entire schema, not just among the siblings under a single parent node. Therefore, every possible path from the root node to a record or a field may be identified by the ID assigned to the record or the field.

One more difference is that a field or a record node may have an optional attribute for content grouping or content presentation purposes. This attribute is called "pseudo", which just as easily could have been designated "implicit" or "anonymous" or something else. A record node with the attribute "pseudo" is similar to a "group" in the XML schema. A field node with the attribute "pseudo" is used to describe some data at certain position of the hierarchical structure without a name. This is similar to the mixed content model in the XML schema where some character data can exist between two named elements. However in the present invention, a "pseudo" field can describe the data at exact position with exact value constraints (e.g. data type). This attribute also allows modeling of multi-dimensional arrays. The FIG. 4 "Star" node is one example of a "pseudo" node.

So to summarize, in the present invention, the schema will be a tree structure comprising record nodes and field nodes with one root node, and the schema can be constructed according to the following rules:

1: A record node or a field node is defined and used only once in said tree structure.

2: Each node is defined by at least a name, a unique ID, and a type identifier.

3: This unique ID is unique among all the nodes in said tree structure, and the unique ID will uniquely identify the full path from the tree structure's root node to the position of a given node of interest.

4: The type identifier for a record node defines the content model of the record as either "sequence" or "choice", wherein the value "sequence" is the default value and hence is not required to appear; and the type identifier for a field node specifies the data type of the scalar value of the field node.

5: Each node has two "optional attributes": here called maxOccurs and minOccurs, wherein the default value for both attributes is "1", wherein a value greater than "1" for maxOccurs indicates that the node is repeatable, and a value of "0" for minOccurs indicates that the node is optional.

6: Each field node has optional attributes to specify the value constraints.

7: Each node further has an optional attribute "pseudo" to indicate that the node is for content grouping or content presentation purposes.

The rules outlined here are not intended to be limiting, but are rather provided to describe how a schema in the present invention can be constructed. It shall also be observed by a skilled worker in the art of schemas that a schema definition in the present invention can be automatically generated from a schema definition in other methods, for example, an XML schema.

FIG. 4 is a schema defined using the methods in present invention. This schema describes the hierarchical data in FIG. 1. As a comparison, FIG. 2 is an XML representation of the same data in FIG. 1, and FIG. 3 is the XML schema representation of the schema in FIG. 4.

Columnar Representation and Storage in a Computer Database

After a schema is created for a particular type of hierarchical data and a plurality of instance data for this type of hierarchical data are received, the next phase of the present invention methods is to match each instance data against the schema and produce a plurality of columns of data. This process is generally performed in the following steps:

1: Parse the schema to create a tree structure. This tree structure is the template for the instance data that is another tree structure.

2: Recursively traverse through the instance data tree and match each node to a node in the schema tree.

The leaf nodes in the instance data tree are the actual scalar values, such as a string or an integer. The other nodes are all metadata that are already defined in the schema. So except for the leaf nodes, each node in the instance data tree must match a node in the schema tree. Also, multiple nodes in the instance data tree may match the same node in the schema tree.

3: A record node in the instance data tree is ignored if it matches a node in the schema tree that is non-repeatable, non-optional and non-choosable.

4: Allocate a column for each field node in the schema tree that has at least one matched node in the instance data tree. The column is identified by the field's unique ID. Store all the scalar values (in the leaf nodes) of these matched nodes into the column. The order of the value entries in the column is the same as the hierarchical tree traversal order. This column is called a value column.

5: Allocate a column for each repeatable, optional or choosable node in the schema tree that has at least one matched node in the instance data tree. The column is identified by the node's unique ID. Store the occurrence numbers into this column. The order of the occurrence number entries in the column is the same as the traversal order. This column is called an occurrence column.

Here each occurrence number in an occurrence column indicates the total number of occurrences of the node under a single occurrence of the node's parent node. Since any record node in the data tree is ignored if it matches a node in the schema tree that is not repeatable, optional or choosable, the occurrence numbers in the occurrence columns have the following relationship:

If two occurrence columns allocated to two schema tree nodes that have the closest ancestor-descendant relationship in a path, then for each occurrence number in the ancestor node's occurrence column, there are the same number of occurrence number entries in the descendant node's occurrence column. Further, each occurrence number in the descendant node's occurrence column indicates the total number of occurrences of the node under a single occurrence of the ancestor node.

The occurrence numbers in the occurrence columns, together with the schema, fully preserve the hierarchical relationship in the instance data tree.

FIG. 6 shows how the data in FIG. 1 is organized in a plurality of columns.

Notice in the FIG. 6, for some fields, there are two columns associated with the field's unique ID, a value column and an occurrence column. This is because here the fields are either optional or choosable. In fact, a repeatable field may also be allocated a value column and an occurrence column. In these cases, a computer system may additionally assign an additional column identifier to differentiate between the two types of columns. As another alternative, the computer system may also assign an additional unique ID to the field in the schema and identify the additional occurrence column by the additional unique ID; or simply modify the definition of the field in the schema by:

1: Defining a record node as the parent node of said field and inserting it into the current position of said field.

2: Assigning all the occurrence attributes of the field to this grouping node and removing the occurrence attributes from the field.

3: Assigning this record node the attribute "pseudo".

The results of this instance data to schema matching process, a plurality of columns, may then be used for various activities, such as storing the columns of data in a computer database, or serializing the columns of data into a stream of bytes of data (e.g. for message transmission); or performing one or more queries on the data. Additionally, other operations, such as updates, insertions, and deletions may also be done.

In some embodiments of the present invention, various methods may be used to store the resulting plurality of columns of data in a computer database (e.g. in computer memory). In the methods of database storage operation, for each fixed length field such as an integer field or a string field with the "length" attribute specified, the value entries in the field's column may be consecutively stored in the allocated disk or memory space for the field, so that each value entry occupies pre-defined number of bytes or characters. For each variable length field, the computer system may also store the value entries in the field's column consecutively in the allocated disk or memory space. However, to accommodate this variability, generally each value may be preceded by the length of the value so as to indicate how many bytes or characters the actual value occupies. Alternatively the lengths of the value entries may be stored consecutively, followed by consecutive storage of the value entries. For each occurrence column, the value entries are the occurrence numbers, and they are generally of fixed length type because they are integers, so the computer system may store these occurrence numbers consecutively in allocated disk or memory space. Whether the numbers in an occurrence column are to be stored as a byte, a short, an int, or other big numbers that occupy more bytes for each entry may be decided by the value of the attribute "maxOccur" of the node in the schema.

It shall be observed by a skilled worker in the art of data storage that the allocated disk or memory space for each column may contain one or more chunks of unit space, in one or more different computer storage systems. Also, data for different columns can be stored either consecutively or separately, in either a grouped or partitioned manner.

It shall also be observed by a skilled worker in the art of schema and data storage that columnar representation of hierarchical data and the schema definition in the present invention allow great flexibility in schema evolution by using a unique ID to identify a column. For example, changing the name of a node in the schema does not really affect the columnar representation of the data. As another example, since adding a field in the schema interface may be done by defining this field to be optional, by allocating a new value column and a new occurrence column for the field, and by adding zero occurrences in the occurrence column to match existing data, backward and forward compatibility may be maintained.

It shall further be observed by a skilled worker in the art of database management systems that this columnar representation and storage of hierarchical data shall also work for relational data, wherein data is organized in a plurality of tables. This is because a table is one of the simplest hierarchical structures, wherein from schema perspective there exists one repeatable record and the record has a plurality of child fields, wherein from data perspective each row in a table is actually an instance data of the table schema. In fact, a hierarchical data in this columnar representation can be interpreted as a plurality of column-wise interwoven tables with the original hierarchical relationship built in, wherein each table is associated with a node in the schema that is allocated an occurrence column, wherein the columns are identified by the unique IDs. Therefore, a new type of database management systems can be built to support both the hierarchical data and the relational data using the columnar representation in the present invention.

Query, Update, Delete and Insert Operations

In some embodiments of the present invention, the invention's methods can also be used to perform query operations on the data in the columnar form. As discussed previously, the hierarchical data represented using the invention's columnar representation are in fact stored as a plurality of interwoven flat tables with a hierarchical relationship built in. Thus a SQL like system can be developed to manage this data. Given a computer database comprising a plurality of hierarchical data, wherein a flat table is a special case of a hierarchical structure, according to the invention, a data management system will generally use the schema definitions as the interfaces to the data, and SQL like statements can be constructed based on the schema interfaces. However, there exist a few important differences between the SQL and the "SQL like":

1: A SQL like statement will use paths in the schema interfaces, wherein each path will be optimized to the unique ID of the node that the path leads to. The unique ID is used to locate the column data.

2: A SQL like query language must support nested queries, wherein the nested queries will in general construct a hierarchical relationship. This query language shall provide the comparable functionalities to the XQuery on XML data.

3: The intermediate data between an application and the invention's computer database management system is a hierarchical data in the columnar form. The hierarchical relationship in the intermediate data is derived from the SQL like statements and the schema interfaces.

As an example, using the schema in FIG. 4 and the data in FIG. 6, a simple query statement can be:

select Movielist.Movie where Movielist.Movie.Date= "2012"

The result of this query is:

| | | | | | | | Unique ID | | | |
|---|---|---|---|---|---|---|---|---|---|---|
| 4 | 5 | | 6 | 6 | 8 | 9 | 9 | | 10 | 10 |
| 1 | Madagascar 3 | 1 | | 2012 | 3 | 1 | Ben Stiller | 0 | Jada Pinkett Smith |
| | | | | | | 0 | Chris Rock | 1 | |
| | | | | | | 1 | | 0 | |

Here the schema for these columns of data is the record node MovieList.Movie as defined in the schema interface MovieList. When executing this query statement, the query engine iterates through all the columns related to the node MovieList.Movie and uses the occurrence numbers to retrieve the value entries in each column.

When a query statement involves paths from different schema interfaces, typically join operations may have to be used. This is true even within a single schema interface, when for example two repeatable nodes (e.g. tables) are used in the statement.

The insertion operation may be used to insert an instance of a repeatable or optional node into existing data. The instance data to be inserted is also represented in the columnar form. An insertion statement may be done by constructing an insert statement with expressed conditions. Here this insertion statement will use full paths in the schema interface. This insertion statement may then be optimized by, for example, using unique IDs to replace each full path for the relevant referenced nodes. A method or system using the method can then execute this optimized insert statement, and insert the instance data into the corresponding columns at the position that satisfies the expressed conditions.

The deletion operation is the opposite operation of the insertion operation. It may be used to delete an instance of a repeatable or optional node from existing data.

Figure 7:
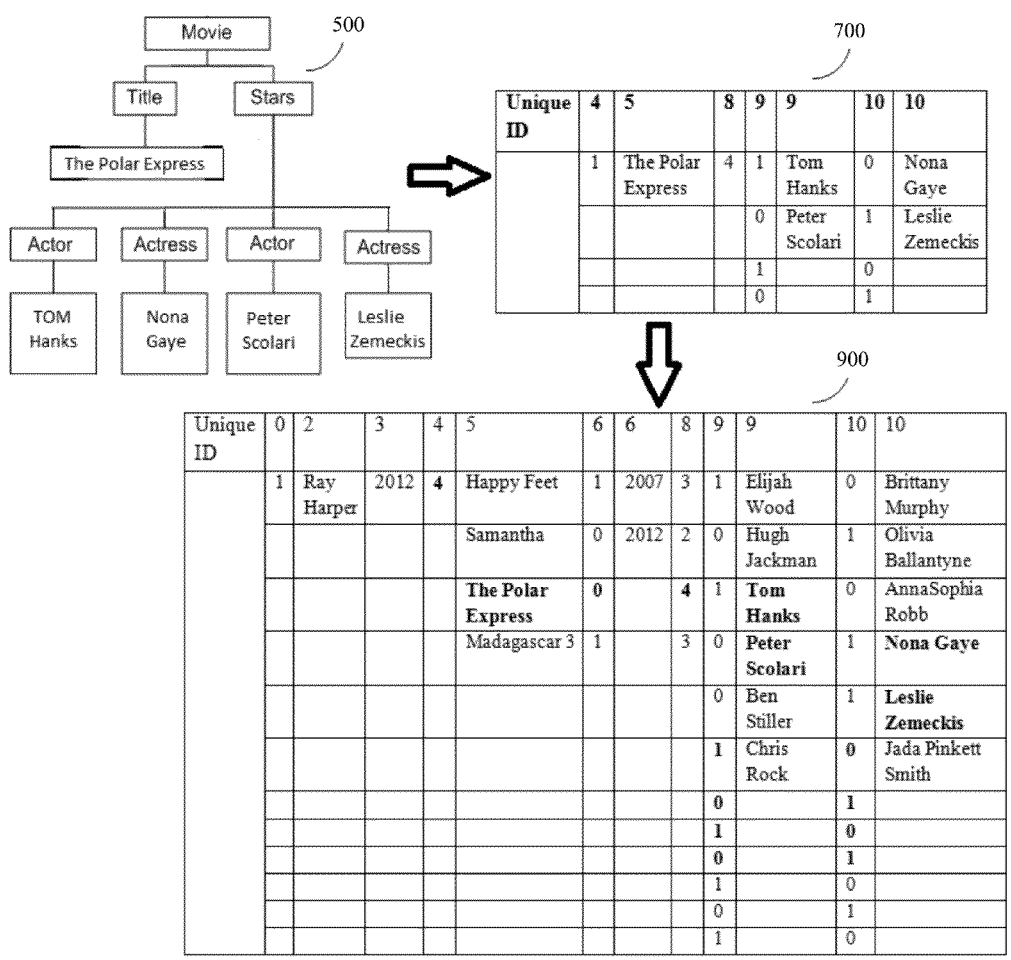
FIG. 7 displays how the invention's methods can also perform various insertion and deletion operations on the data in the invention's column based format.

An example of insertion and deletion is given in FIG. 7.

The "update" operation is similar to that in SQL standard. It is used to modify values in specific columns. Since hierarchical data often comprises a plurality of "tables", this operation shall generally be restricted to operate on one such "table" at a time.

These discussions are not meant to be limiting, but rather are intended to show that a database management system may be built using the columnar representation of hierarchical data as the basic data structure, and further that in such a system, relational data may be supported and SQL like operations may be applied.

Data Serialization

In some embodiments of the present invention, methods of data serialization may be used to combine data in a plurality of columns to form a stream of bytes, or a message, described by a schema interface, to be sent over a network. These data serialization methods can be used in data exchange among business entities and computer systems. Such data serialization methods are also required in the database management system discussed previously. Here, for example, in order to exchange intermediate data (e.g. query results) between an application and the database, the data is generally serialized. Such serialization methods may use steps described below (for illustration purpose, the lower-level character encoding details are not discussed).

In a preferred embodiment, the invention may serialize the data according to the following steps:

1: A first byte is used. The two lower bits may be used to specify how many bytes are needed to store a unique ID. The two bits can represent four possible values: 0, 1, 2, and 3. The values may correspond to alternative unique ID storage schemes such as unsigned byte, short, int and long, each of which takes 1 byte, 2 bytes, 4 bytes, and 8 bytes. A default value can be set, for example, to 0. The rest of bits in this byte can be used to specify things like character encoding.

2: Each column may start with the unique ID, then a reserved byte, followed by the number of total entries in the column, and finally the entry values.

If the entry values in a column are variable-length values, each value may comprise two parts, the length of the value and the actual value. Alternatively, the length values for all the entries can be stored together, followed by all the actual entry values.

The first two bits in the reserved byte after the unique ID may specify how many bytes are needed to store the number of entries in the column. The usage is the same as in the first byte.

When the entry values are variable length values, the second two bits in the reserved byte may specify how many bytes are needed to store the length of each value. The usage is the same as in the first byte.

When both an occurrence column and a value column are allocated for a same field, and these two columns are identified by the same unique ID of the field, the third two bits in the reserved byte may be used to identify if the column is the occurrence column or the value column. A "1" may be used to represent the occurrence column, and a "0" the value column.

3: It is possible that a column may only have one entry or even no entry. For example in FIG. 4, if the schema does not define the root node "MoveList" as repeatable, then the fields "Creator" and "Cdate" can only have one value. Further, if the field "Cdate" is optional, the column may not have any entry. In this case, if a column does not contain any entry, it is ignored and not serialized. If a column have and can only have one entry, the serialized form does not contain the number of entries. If the field is a fixed length field, even the reserved byte is not needed.

4: The final stream of bytes may be produced by concatenating results from each column. The order of column concatenation (as long as a consistent scheme is used) is not important because each column data is self-contained and the column ID is unique in the entire message.

An example of serializing the data shown in FIG. 6 is given in FIG. 8, with comments for each column.

The steps outlined here are not intended to be limiting, but are rather provided to illustrate how data in the columnar form in the present invention may be serialized into a steam of bytes to be sent over networks.

Examples

FIG. 1 shows an example of data, here a list of movies, composed of a plurality of data entries or nodes, which are structured or organized in a hierarchical relationship (100). In this example, the hierarchically structured data has a header that shows that the list was originally created by Ray Harper in 2012 (Cdate). The list has three movies, "Happy Feet", "Samantha" and "Madagascar 3", all of the movies have a brief list of stars (actors and actresses), and some of the movies list their production dates as well.

In FIG. 1, the list's root node is shown as (102). In this example, the list has three (3) occurrences of a repeatable record node "Movie" (104) with data fields corresponding to different movie entries, as well as a non-repeatable record node (106) corresponding to the list header.

Further, each repeatable record node "Movie" has a sequence of nodes: a mandatory field node "Title" (108), an optional field node "Date" (110) and another mandatory record node "Stars" (112). The record node "Stars" in turn contains a list of field nodes, Actors (114) and Actresses (116), not necessarily in any particular order.

The various leaf nodes of the data structure are shown as (118), (120), (122a-122c), (124a-124b), (126a-d) and (128a-d). These are the value nodes, the rest of the nodes are record nodes and field nodes that give the meaning (i.e. hierarchical context) to the value nodes.

If only prior art methods were used, to query this hierarchically structured data list, and find answers to a query such as: "What movies did Elijah Wood star in?", the computer must traverse up and down the hierarchy, visiting many branches, before determining that Elijah Wood starred in the 2007 movie "Happy Feet". This prior art type hierarchical query would take many computer processor operations (clock cycles) to execute, and thus is relatively slow and inefficient. However by using the invention's methods, the query can be performed with much higher efficiency.

FIG. 2 shows how the hierarchical structured movie list example from FIG. 1 would be represented, or transmitted as a message, according to a prior art XML format. Essentially the text message in FIG. 2 is a serialization of the hierarchical data in FIG. 1, and the text message can be stored in a computer database, a file system or transmitted over networks. As shown in the Figure, an XML message not only includes the value entries (the leaf nodes) but also the tags (record nodes and field nodes). Although this approach is good for human readability, it makes the XML message itself very verbose and large in size (e.g. requires a large number of bits).

To perform query or other operations on this XML format using prior art methods, the computer system will typically use a software parser to first parse the XML text and build a hierarchical structure similar to the one shown in FIG. 1. This prior art approach is thus processor clock cycle intensive, and further slows down the process of the intended operations.

FIG. 3 shows an XML schema created to represent the hierarchical relationship and the value constraints of the data entries previously shown in FIG. 1, and expressed in XML message format in FIG. 2. An XML schema is useful for data interpretation and especially for data validation. However, as it is shown in FIG. 3, it is again very verbose.

FIG. 4 illustrates how the invention's methods define a schema for the same hierarchical relationship and the value constraints of the data entries previously shown in FIG. 1. As shown, here the invention's schema is an expanded tree-like structure with one root node. In this tree structure, each node is assigned a name and a unique ID (400) that is unique in the entire structure. Further, each field node has a simple type to define its value constraint. The simple type can be a base type or a type derived from another simple type with restrictions. For each record node, there is a type attribute too, but here only the node "Star" explicitly has a type "choice" (402) specified, the type for other record nodes is the default type "sequence" (not shown).

The record node "Star" contains an attribute "pseudo" (404), which means that this node is a content grouping node and it will not appear in the instance data presentation as shown in FIG. 1. The XML schema definition in FIG. 3 further defines this node as a "group".

The record nodes "MovieList", "Movie" and "Star" (406) are repeatable. The field node "Date" (408) under "Movie" is optional. These nodes affect how the invention's methods must store or serialize the instance data. If every node in the schema is neither repeatable nor optional nor choosable, then one can use a flat row to store the value entries (the leaf nodes in an instance data), and the hierarchical relationship among the data entries in the instance data is defined by the schema itself.

Note that here, the invention's schema differs slightly from the XML schema definition previously shown in FIG. 3. In FIG. 4, the invention's root node "MovieList" is repeatable, but it is not in the XML schema. This difference allows multiple movie lists to be stored together in a computer memory or serialized into a single message.

Figure 5:
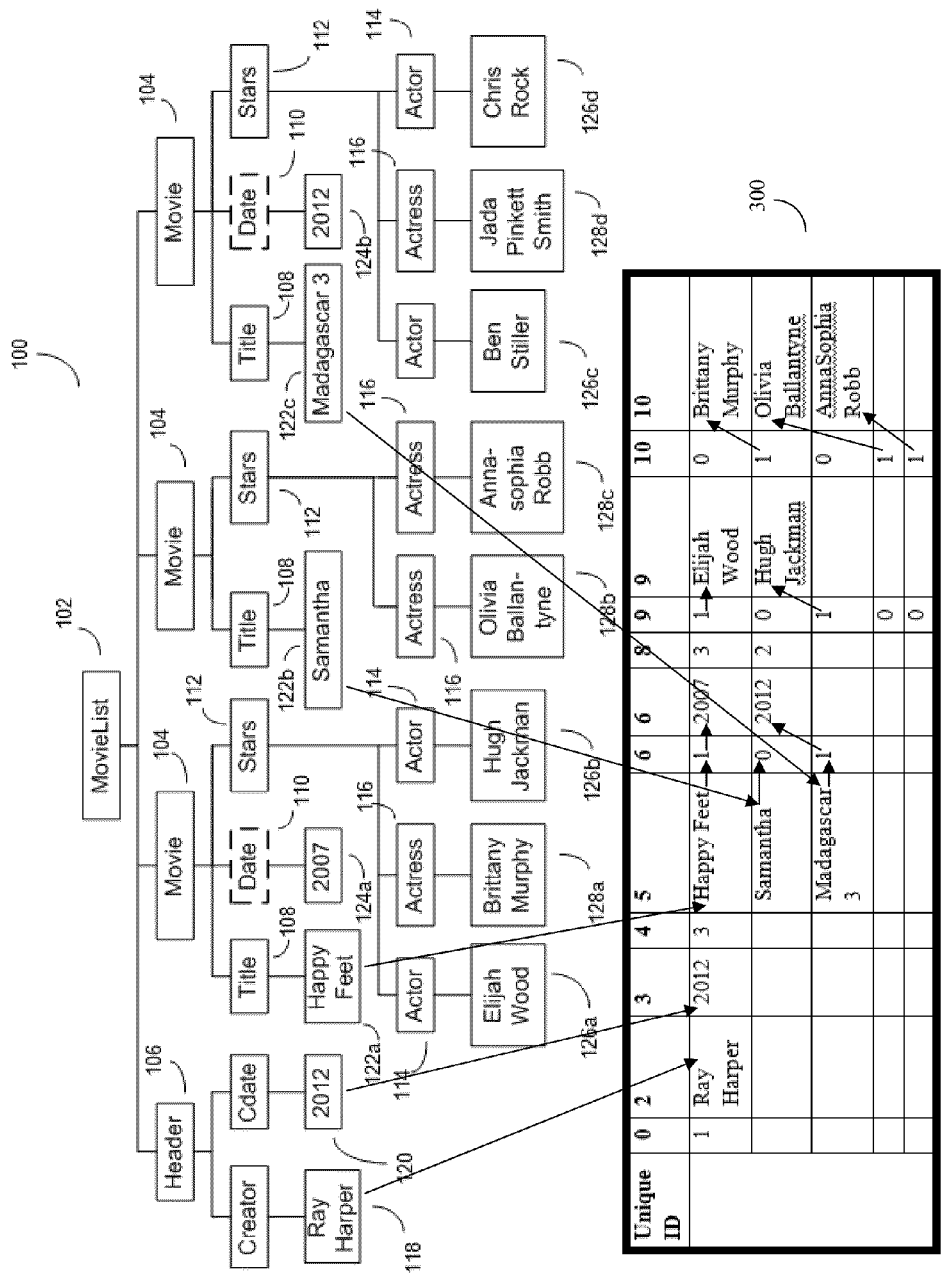
FIG. 5 illustrates how the invention's methods can organize the hierarchical data from FIG. 1 into an alternate column oriented format that can be stored in computer memory. Note that the invention's methods only store the value entries, the leaf nodes from FIG. 1, and the occurrence numbers for the repeatable, optional and choosable nodes. The hierarchical relationship among the data entries in FIG. 1 is thus jointly preserved by the occurrence columns in the stored data, and the schema in FIG. 4.

FIG. 5 demonstrates how the invention's methods organize the hierarchical data in FIG. 1 into the columnar form comprising occurrence columns and value columns that can then be stored in computer memory and/or serialized and transmitted over a network. Once in memory, a computer processor can then, for example, perform query, update, insert or delete on the data with much higher efficiency relative to prior art hierarchical methods.

The invention's methods produce a plurality of columns (300) by traversing the instance hierarchical data tree (100) in preorder and matching each node against the metadata schema in FIG. 4. Here for illustration purposes, the columnar form (300) only contains the data for the first two movies and the third movie's "Title" and "Date" fields. In this columnar form (300):

1: The occurrence column identified by unique ID "0" is allocated for the root node "MovieList" because the root node is repeatable. It contains a single value "1" indicating that there is one "MovieList" in the instance data (100).

2: The value columns identified by the unique IDs "2" and "3" are for the fields "Creator" and "Cdate" under the record node "Header", each containing one value entry "Ray Harper" and "2012" respectively since there is only one "MovieList" in FIG. 1. In these columns, nothing is stored regarding the record nodes "Header", "Creator" and "Cdate". This is because these nodes are required to occur and occur only once for each "MovieList", so the occurrence number "1" in the occurrence column "0" already implies the existence of these nodes in the instance data, and the schema in FIG. 4 defines the hierarchical relationship among them.

3: The occurrence column "4" is allocated for the repeatable node "Movie". It contains the value "3" (e.g. 1+1+1) indicating that there are three movies in the list. The value column "5" is for the field "Title" under the "Movie" node. There are three value entries in this column.

4: The occurrence column "6", for the field "Date" under the node "Movie", contains three value entries: "1", "0", and "1", matching the number "3" in the ancestor occurrence column "4". The number "0" in this column means that the second "Movie" does not have the value for the "Date" field. This is also shown in the value column "6", allocated for the field "Date", which contains two entries "2007" and "2012".

5: Here the occurrence column and the value column share the same unique ID "6" because the field "Date" is an optional field (minOccurs="0").

6: The occurrence column "8" is allocated for the repeatable node "Star". As shown, it contains two numbers "3" (e.g. 1+1+1) and, and a "2" (e.g. 1+1). The numbers in this occurrence means that there are 3 stars in the first "Movie" and 2 in the second "Movie". The occurrence number for the third "Movie" is not listed here.

7: The repeatable node "Star" is of type "choice" with two child nodes "Actor" and "Actress". This means that a "Star" is either an "Actor" or an "Actress". For this reason, an occurrence column and a value column are allocated for each of the child nodes, "Actor" and "Actress". There are 5 entries in this column, which is equal to the sum of the two numbers in the occurrence column "8" (e.g. 3+2).

Note that there are two "1"s indicating two "Actors in the occurrence column "9" and three "1"s indicating three "Actresses in the occurrence column "10". These two columns determine if each "Star" in the occurrence column "8" is an "Actor" or an "Actress".

The value columns "9" and "10" contain the actual names of the Actors and Actresses, each of the names corresponding to a "1" in the occurrence column "9" or "10".

FIG. 6 shows the final plurality of columns produced by the invention's methods that are used to represent the hierarchical data in FIG. 1. The hierarchical relationship among the data entries in FIG. 1 is preserved by the entries in the occurrence columns in this Figure and the schema itself in FIG. 4.

FIG. 7 shows how the invention's methods may perform insertion and deletion operations on data in the columnar form. In this example, the movie list creator inserts another movie, "The Polar Express" into the list. Here for illustration purposes, the new movie is inserted after the movie "Samantha". The insertion takes a few steps:

1: Represent the new "Movie" data (500) in a columnar form (700). The schema for a "Movie" is already defined in FIG. 4 as part of the schema for the "MovieList".

2: Insert the data in the column based format (700) into the existing "MovieList" in FIG. 6. Since the data is inserted after the movie "Samantha", this step includes:

2a: Increase the entry value in the occurrence column "4" from 3 to 4 because now there are four movies.

2b: Insert the title "The Polar Express" after "Samantha" in the value column "5".

2c: Insert a "0" after the "0" in the occurrence column 6 because the new movie also does not have a "Date" value.

2d: Similarly insert the rest of column data in (700) into the corresponding columns in the MovieList in FIG. 6. The final result is shown in the columnar form (900).

The deletion operation is the opposite operation of the insertion. In this example, if the movie "The Polar Express" is to be deleted from the columnar form (900), the computer system would first find the portion of data entries in each column belong to a movie by iterating through the occurrence columns "6", "8", "9" and "10". The system would then delete the entries and shift the rest of entries in each column respectively so that the entries in each column are always stored consecutively, and finally decrease the number in the occurrence column "4" from 4 to 3.

FIG. 8 shows how the invention's methods can serialize the columns of data, previously shown in FIG. 6 into a stream of bytes. Once the data is serialized, then the stream of bytes can be sent over various internal and external computer networks as desired. In this example, for illustration purpose, character encoding is not considered, and it is simply assumed that one character takes one byte in a stream.

Alternative Embodiments

In alternative embodiments, the invention may further comprise a computer program product (e.g. computer code, computer instructions) in a computer readable storage medium, comprising code to instruct at least one computer processor to perform the operations described herein. In yet another embodiment, the invention may comprise a computer system configured to perform the operations described herein. The invention may further comprise a method of operating a plurality of clustered computers or servers according to the methods herein.

The invention claimed is:

1. A method of organizing hierarchical data in a columnar form to be stored in a computer database or transmitted over networks, said method comprising:
   using a computer processor to create a fully expanded tree-like metadata schema for a type of hierarchical data;
   wherein said schema is a fully expanded tree-like structure comprising record nodes and field nodes with one root node, wherein:
   a: a record node or a field node is defined and used only once in said tree structure;
   b: each node is defined by at least a name, a unique ID, and a type identifier;
   c: said unique ID is unique among all the nodes in said fully expanded tree-like structure, and said unique ID uniquely identifies the full path from the said root node to the said node in said fully expanded tree-like structure;
   d: said type identifier for a record node defines the content model of said record as either "sequence" or "choice", wherein the default value is "sequence", and said type identifier for a field node specifies the data type of the scalar value of said field node;
   e: each node has two optional attributes: maxOccurs and minOccurs, wherein the default value for both attributes is "1", wherein a value greater than "1" for maxOccurs indicates that the node is repeatable, and a value of "0" for minOccurs indicates that the node is optional;
   f: each field node has optional attributes to specify the value constraints; and
   g: each node further has an optional attribute pseudo to indicate said node is for content grouping or content presentation purposes;
   using a computer processor to receive a plurality of instance data of said type of hierarchical data; said instance data comprising a plurality of data entries organized in a hierarchical relationship;
      matching each instance data against said schema and producing a plurality of columns of data, wherein there exists two types of columns, value columns and occurrence columns;
   wherein each said instance data is matched against said schema in a chosen tree traversal order;
   for each field node in said schema, allocating a value column in said columnar form and storing the scalar values for all matched data entries in said value column, and identifying said value column by the unique ID of said field node;
   for each repeatable, optional or choosable field and record node in said schema, additionally allocating an occurrence column in said columnar form, storing occurrences in said occurrence column, and identifying said occurrence column by the unique ID of said respective field and record node;
   discarding other matched data entries; and
      each value column comprises an array of scalar values of same data type for a field in said schema; each occurrence column comprises an array of occurrence numbers for a node in said schema, wherein said node is repeatable, optional or choosable;
      wherein each occurrence number in an occurrence column indicates the total number of occurrences of the node under a single occurrence of the node's parent node; and
      said hierarchical relationship among said data entries is jointly preserved by said schema and said occurrence numbers in said occurrence columns;
   storing said columns of data in a computer database; or
   serializing said columns of data into a stream of bytes of data; or
   performing at least one of a query, update, insertion, or deletion on said hierarchical data as stored in said columnar form.

2. The method of claim 1, further performing a query operation on said hierarchical data organized in said columnar form by:
   constructing a query statement directed to one or more nodes in a fully expanded tree structure determined by said schema, wherein said query statement uses full paths in said fully expanded tree structure, wherein a plurality of sub-queries may be included;
   optimizing said query statement, wherein each said unique ID replaces each said full path for each referenced node, and wherein said unique ID points to the column of data it identifies; and
   executing the optimized query statement and retrieving data in a columnar form.

3. The method of claim 1, further performing an update operation on said hierarchical data organized in said columnar form by:
   constructing an update statement with expressed conditions directed to one or more field nodes in a fully expanded tree structure determined by said schema, wherein said update statement uses full paths in said fully expanded tree structure;
   optimizing said update statement, wherein each said unique ID replaces each said full path for each referenced node, wherein each said unique ID points to each column of data it identifies; and
   executing the optimized update statement and replacing value entries in the columnar form with supplied values at the position that satisfies the update statement expressed conditions.

4. The method of claim 1, further performing an insert operation on said hierarchical data organized in said columnar form by:
   organizing the data to be inserted in said columnar form, wherein said data comprises at least one instance of a repeatable or optional node in a fully expanded tree structure determined by said schema;
   constructing an insert statement with expressed conditions directed to said repeatable or optional node in said fully expanded tree structure, wherein said insert statement uses full paths in said fully expanded tree structure;
   optimizing said insert statement, wherein each said unique ID replaces each said full path for said referenced nodes; and executing the optimized insert statement, and inserting said data into corresponding columns in the existing data at the position that satisfies said insert statement expressed conditions.

5. The method of claim 1, further performing a delete operation on said hierarchical data organized in said columnar form by:

constructing a delete statement with expressed conditions directed to one repeatable or optional node in a fully expanded tree structure determined by said schema, wherein said delete statement uses full paths in said fully expanded tree structure;

optimizing said delete statement, wherein each said unique ID replaces each said full path for said referenced nodes; and executing the optimized delete statement, and deleting the instance data of said repeatable or optional node in the existing data according to said delete statement expressed conditions.

6. The method of claim 1, wherein a repeatable, optional or choosable field is also allocated an additional occurrence column;

wherein said additional occurrence column and said value column are both identified by the same said unique ID, further assigning an additional column identifier to differentiate the two types of columns; or alternatively assigning an additional unique ID to said repeatable, optional, or choosable field in a fully expanded tree structure determined by said schema and identifying the additional occurrence column by said additional unique ID; or alternatively performing the steps of:

h: defining a content grouping node as the parent node of said field node, inserting it into the current position of said field node, and identifying said occurrence column by the unique ID of said content grouping node;

i: assigning said content grouping node the attributes "maxOccurs" and "minOccurs" with desired value; and j: assigning said content grouping node the attribute "pseudo".

7. The method of claim 1, wherein an occurrence column in said computer database is allocated for a repeatable, optional, or choosable node, wherein an occurrence number in said occurrence column in said computer database is used to indicate the total number of occurrences of said node in a single occurrence of said node's parent node;

wherein if an ancestor node of said node is also allocated an occurrence column, and no other nodes between said ancestor node and said node is allocated an occurrence column, then for each occurrence number in said ancestor node's occurrence column, assigning a same number of occurrence number entries in said node's occurrence column.

8. The method of claim 1, further storing a plurality of said value columns and occurrence columns as columns of data in a computer database, said columns of data representing said instance data of said type of hierarchical data, wherein each column comprises an array of value entries of same data type and is identified by said unique ID, wherein:

for each fixed length field, storing the entries of the value column consecutively in allocated disk or memory space, wherein each entry occupies pre-defined number of bytes or characters;

for each variable length field, storing the entries of the value column consecutively in allocated disk or memory space, wherein each value is preceded by the length of the value; or storing the lengths of the value entries consecutively, and then storing the values consecutively;

for each occurrence column, storing the occurrences consecutively in allocated disk or memory space;

wherein said allocated disk or memory space for each said column may contain one or more chunks of unit space from one or more storage devices, wherein said entries from different columns may be stored either consecutively or separately, in either a grouped or partitioned manner.

9. The method of claim 1, further serializing and transmitting a plurality of columns of data as a message comprising a stream of bytes of data to be transmitted over at least one computer network; said method comprising:

for each column, concatenating said unique ID, the total number of entries, and the entry values to form bytes of data, wherein:

said unique ID and the total number of entries each comprise a fixed number of bytes in said message;

if said column is allocated for a fixed length field, each value entry comprises a fixed number of bytes or characters in said message;

if said column is allocated for a variable length field each value entry comprises a variable number of bytes or characters in said message, each said value being preceded by a length value in said message;

if said column has a maximum one value as may be determined by said schema, discarding the total number of entries after said unique ID;

concatenating said bytes of data from different columns together; and transmitting said message with or without an attached copy of said schema.

10. A computer program product in a non-transitory computer readable storage medium, the product comprising computer code for instructing a computer processor to organize hierarchical data in a columnar form to be stored in a computer database or transmitted over networks, said computer code further comprising instructions for:

using a computer processor to create a fully expanded tree-like metadata schema for a type of hierarchical data;

wherein said schema is a fully expanded tree-like structure comprising record nodes and field nodes with one root node, wherein:

a: a record node or a field node is defined and used only once in said tree structure;

b: each node is defined by at least a name, a unique ID, and a type identifier;

c: said unique ID is unique among all the nodes in said fully expanded tree structure, and said unique ID uniquely identifies the full path from the said root node to the said node in said fully expanded tree-like structure;

d: said type identifier for a record node defines the content model of said record as either "sequence" or "choice", wherein the default value is "sequence", and said type identifier for a field node specifies the data type of the scalar value of said field node;

e: each node has two optional attributes: maxOccurs and minOccurs, wherein the default value for both attributes is "1", wherein a value greater than "1" for maxOccurs indicates that the node is repeatable, and a value of "0" for minOccurs indicates that the node is optional;

f: each field node has optional attributes to specify the value constraints; and g: each node further has an optional attribute pseudo to indicate said node is for content grouping or content presentation purposes;

using a computer processor to receive a plurality of instance data of said type of hierarchical data; said instance data comprising a plurality of data entries organized in a hierarchical relationship;

matching each instance data against said schema and producing a plurality of columns of data, wherein there exists two types of columns, value columns and occurrence columns;

wherein each said instance data is matched against said schema in a chosen tree traversal order;

for each field node in said schema, allocating a value column in said columnar form and storing the scalar values for all matched data entries in said value column, and identifying said value column by the unique ID of said field node;

for each repeatable, optional or choosable field and record node in said schema, additionally allocating an occurrence column in said columnar form, storing occurrences in said occurrence column, and identifying said occurrence column by the unique ID of said respective field and record node;

discarding other matched data entries; and each value column comprises an array of scalar values of same data type for a field in said schema; each occurrence column comprises an array of occurrence numbers for a node in said schema, wherein said node is repeatable, optional or choosable;

wherein each occurrence number in an occurrence column indicates the total number of occurrences of the node under a single occurrence of the node's parent node; and said hierarchical relationship among said data entries is jointly preserved by said schema and said occurrence numbers in said occurrence columns;

storing said columns of data in a computer database; or serializing said columns of data into a stream of bytes of data; or performing at least one of a query, update, insertion, or deletion on said hierarchical data as stored in said columnar form.

11. The computer program product of claim 10, wherein a repeatable, optional or choosable field is also allocated an additional occurrence column, wherein said additional occurrence column and said value column are both identified by the same said unique ID, wherein said computer program further instructs a computer processor to perform the steps of:

further assigning an additional column identifier to differentiate the two types of columns; or alternatively assigning an additional unique ID to said repeatable, optional, or choosable field in a fully expanded tree structure determined by said schema and identifying the additional occurrence column by said additional unique ID; or alternatively performing the steps of:

h: defining a content grouping node as the parent node of said field node, inserting it into the current position of said field node, and identifying said occurrence column by the unique ID of said content grouping node;

i: assigning said content grouping node the attributes "maxOccurs" and "minOccurs" with desired value; and j: assigning said content grouping node the attribute "pseudo".

12. The computer program product of claim 10, wherein said computer program further comprises instructions to direct a computer processor to serialize and transmit a plurality of columns of data as a message comprising a stream of bytes of data to be transmitted over at least one computer network; said computer program further comprising instructions to direct a computer processor to:

for each column, concatenating said unique ID, the total number of entries, and the entry values to form bytes of data, wherein:

said unique ID and the total number of entries each comprise a fixed number of bytes in said message;

if said column is allocated for a fixed length field, each value entry comprises a fixed number of bytes or characters in said message;

if said column is allocated for a variable length field each value entry comprises a variable number of bytes or characters in said message, each said value being preceded by a length value in said message;

if said column has a maximum one value as may be determined by said schema, discarding the total number of entries after said unique ID;

concatenating said bytes of data from different columns together; and transmitting said message with or without an attached copy of said schema.

* * * * *